United States Patent
Li et al.

(10) Patent No.: US 10,706,398 B2
(45) Date of Patent: Jul. 7, 2020

(54) METHOD AND SYSTEM FOR MAKING PAYMENT FOR A SERVICE AT A SERVICE STATION

(71) Applicant: MASTERCARD ASIA/PACIFIC PTE. LTD., Singapore (SG)

(72) Inventors: Jiaming Li, Singapore (SG); Xijing Wang, Singapore (SG); Jie Zhang, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 330 days.

(21) Appl. No.: 15/902,087

(22) Filed: Feb. 22, 2018

(65) Prior Publication Data

US 2018/0247288 A1 Aug. 30, 2018

(30) Foreign Application Priority Data

Feb. 28, 2017 (SG) .......................... 10201701569Q

(51) Int. Cl.
| | | |
|---|---|---|
| *G07F 15/00* | (2006.01) | |
| *G06Q 20/12* | (2012.01) | |
| *G06Q 20/32* | (2012.01) | |
| *G06Q 20/40* | (2012.01) | |
| *G06Q 20/42* | (2012.01) | |
| *G06Q 20/14* | (2012.01) | |
| *G06Q 20/20* | (2012.01) | |

(52) U.S. Cl.
CPC ......... *G06Q 20/127* (2013.01); *G06Q 20/145* (2013.01); *G06Q 20/202* (2013.01); *G06Q 20/325* (2013.01); *G06Q 20/3223* (2013.01); *G06Q 20/405* (2013.01); *G06Q 20/4014* (2013.01); *G06Q 20/42* (2013.01); *G07F 15/005* (2013.01)

(58) Field of Classification Search
USPC ..................................................... 705/35, 44
See application file for complete search history.

(56) References Cited

U.S. PATENT DOCUMENTS

| | | | |
|---|---|---|---|
| 8,521,599 B2 | 8/2013 | Rivers, Jr. et al. | |
| 2011/0106329 A1* | 5/2011 | Donnelly ................ | B60L 53/65 700/291 |
| 2012/0191600 A1* | 7/2012 | Boot ..................... | G06Q 20/102 705/40 |

(Continued)

FOREIGN PATENT DOCUMENTS

| | | |
|---|---|---|
| CN | 105069617 A | 11/2015 |
| JP | 2003150865 A | 5/2003 |
| JP | 2007080229 A | 3/2007 |

OTHER PUBLICATIONS

International Search Report and Written Opinion for corresponding PCT Application No. PCT/SG2018/050057 dated Mar. 14, 2018.

*Primary Examiner* — William E Rankins
(74) *Attorney, Agent, or Firm* — Budzyn IP Law, LLC

(57) ABSTRACT

There is provided a method and system for making payment for a service at a service station which allow users to make payment even when their mobile devices lose data connectivity and when there is a high turnover of users at the service station. In addition, the method and system can lead to enhanced revenues at the service stations as well as improved user experiences when making payments at service stations.

18 Claims, 7 Drawing Sheets

(56) References Cited

U.S. PATENT DOCUMENTS

| | | | |
|---|---|---|---|
| 2013/0252577 A1* | 9/2013 | Jordan | H04M 15/68 |
| | | | 455/406 |
| 2015/0364937 A1* | 12/2015 | Becerra | G06Q 30/06 |
| | | | 320/101 |
| 2016/0047862 A1* | 2/2016 | Shimizu | B60L 53/60 |
| | | | 702/63 |
| 2016/0176307 A1* | 6/2016 | Becker | B60L 53/60 |
| | | | 320/109 |
| 2016/0358472 A1* | 12/2016 | Bezak | G08G 1/133 |

* cited by examiner

METHOD AND SYSTEM FOR MAKING PAYMENT FOR A SERVICE AT A SERVICE STATION

FIELD OF INVENTION

Embodiments of the present invention relate to a method and system for making payment for a service at a service station.

BACKGROUND

Provision of on-the-go services such as, for example, charging of mobile device batteries, charging of electric car batteries, providing power for jump starting combustion car batteries is becoming increasingly prevalent. Currently, many such services are either provided at service stations at no charge for particular groups of people (eg. customers of a particular commercial entity) or their use is charged on a per-use basis, which can be adversely perceived to be profiteering (which can be bad for business for a commercial entity).

Some issues for the provision of on-the-go services relate to the high turnover of users. Other than the wear-and-tear at the service stations due to the high turnover of users, payment can also be an issue as requiring the users to queue to make payment diminishes the appeal of the on-the-go services.

Furthermore, where payment is facilitated using the mobile devices of users, there may be issues whenever the mobile devices lose data connectivity before/during payment.

It is generally desirable to improve consumer experiences with making payments for the on-the-go services.

SUMMARY

There is provided a system for making payment for a first service session at a service station initiated by a first user device. The system includes one or more electronic processing devices configured to: provide a service token to a second user device upon establishment of a second service session between the second user device and the service station, the service token comprising a first portion including request information for the second service session, and result information for the first service session; provide, from the second user device, the service token and payment or subscription information to a payment system via a communications network; process, at the payment system, the service token and the payment or subscription information to determine an authorised payment amount; determine, at the payment system, if payment for the first session has been completed; and process, at the payment system, in response to determining that payment for the first service session has not been completed, a payment transaction for the first service session, or an update to the subscription information.

There is also provided a method for making payment for a first service session at a service station initiated by a first user device. The method includes, in one or more electronic processing devices: providing a service token to a second device, upon establishment of a second service session between a second user device and the service station, the service token comprising a first portion including request information for the second service session, and result information for the first service session; providing, from the second user device, the service token and payment or subscription information to a payment system via a communications network; processing, at the payment system, the service token and the payment or subscription information to determine an authorised payment amount; determining, at the payment system, if payment for the first service session has been completed; and processing, at the payment system, in response to determining that payment for the first service session has not been completed, a payment transaction for the first service session, or an update to the subscription information.

There is also provided a payment system configured for making payment for a first service session initiated by a first user device at a service station. The payment system includes one or more electronic processing devices that: receive a service token from a second user device, upon establishment of a second service session between a second user device and the service station, the service token comprising a first portion including request information for the second service session, and result information for the first service session; receive, from the second user device, payment or subscription information to a payment system via a communications network; process the service token and the payment or subscription information to determine an authorised payment amount; determine, if payment for the first service session has been completed; and process, in response to determining that payment for the first service session has not been completed, a payment transaction for the first service session, or an update to the subscription information.

In addition, there is also disclosed a non-transitory computer readable storage medium embodying thereon a program of computer readable instructions which, when executed by one or more processors of a payment system in communication with a plurality of user devices, causes the payment system to perform a method for making payment for a first service session initiated by a first user device at a service station. The method embodies the steps of: receiving a service token from a second user device, upon establishment of a second service session between a second user device and the service station, the service token comprising a first portion including request information for the second service session, and result information for the first service session; receiving, from the second user device, payment or subscription information to a payment system via a communications network; processing the service token and the payment or subscription information to determine an authorised payment amount; determining, if payment for the first service session has been completed; and processing, in response to determining that payment for the first service session has not been completed, a payment transaction for the first service session, or an update to the subscription information.

DESCRIPTION OF FIGURES

In order that the present invention may be fully understood and readily put into practical effect, there shall now be described by way of non-limitative example only, certain embodiments of the present invention, the description being with reference to the accompanying illustrative figures, in which.

DETAILED DESCRIPTION

There is provided a method, and system for making payment for a service at a service station. In at least some embodiments, the method, and system allow users to make payment even when their mobile devices lose data connectivity and when there is a high turnover of users at the service station. In addition, the method, and system may lead to enhanced revenues at the service stations as well as improved user experiences when making payments at service stations.

An example of a method for making payment for a service at a service station will now be described with reference to FIG. 1.

For the purpose of illustration, it is assumed that the method is performed at least in part using one or more electronic processing devices such as a suitably programmed microcontroller forming part of an authentication device which is in communication with one or more user devices, such as mobile phones, portable computers, tablet computers, or the like. The authentication device may be integrated with the service station or may form part of a removable module.

The user devices are also typically in communication with a payment system which may comprise any suitable computer system such as a server that is capable of processing payments made by the user and which may include a number of processing devices associated with each of an issuer, acquirer, card network and payment gateway, or alternatively, the payment processing system may include any one or more of these entities and this will be discussed further below.

The term service station is intended to cover any electrical device that provides charging of batteries, and will typically refer to devices such as, phone chargers, battery chargers, laptop chargers, electric car chargers and the like.

Figure 1:
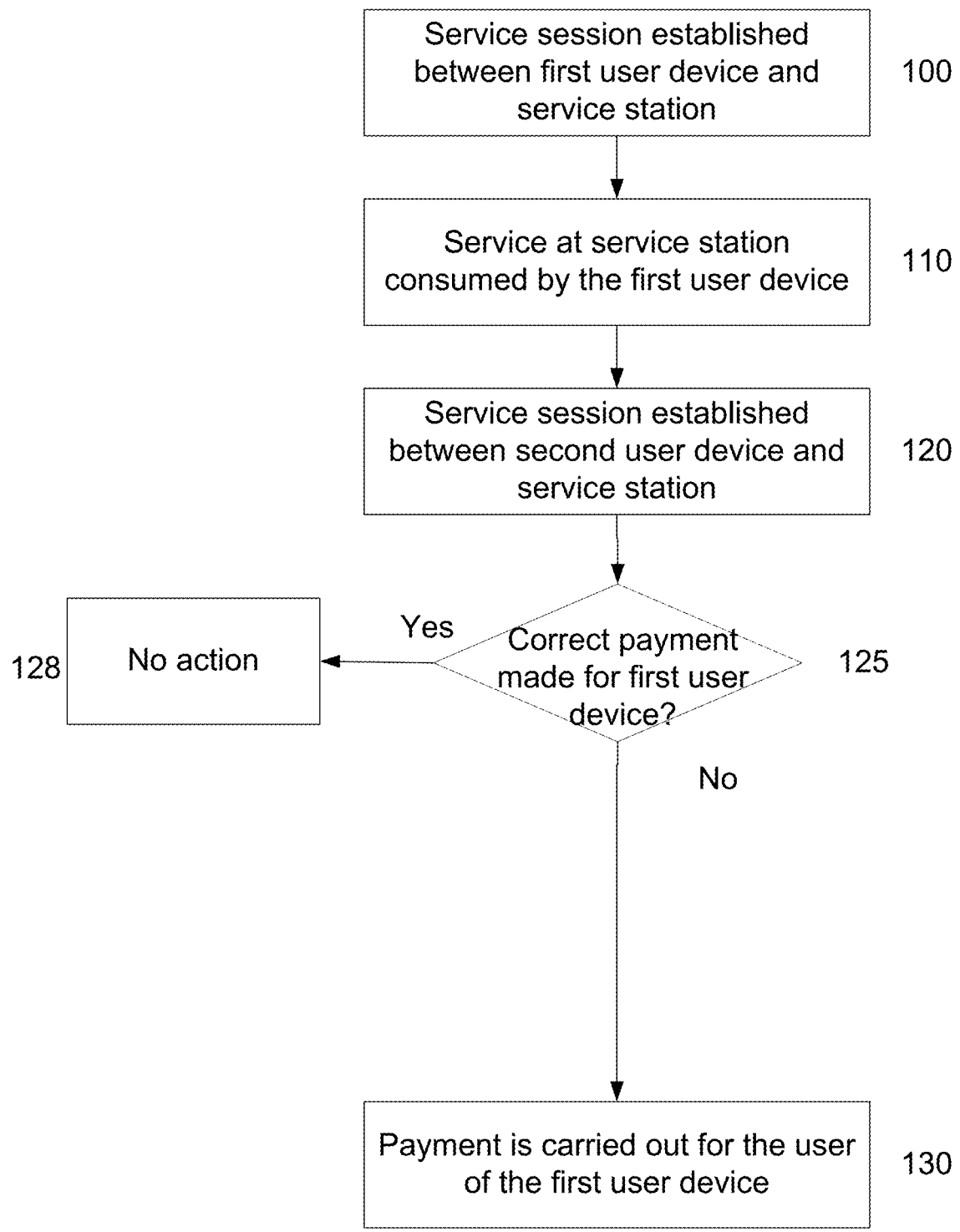
FIG. 1 is a flow chart of an example of a method for making payment for a service at a service station.

In this example of FIG. 1, at step 100, a service session is established between a first user device and a service station. The service session is established when the first user device is authorised to request for a service at the service station. It should be appreciated that the first user device can interface with the service station via an authentication device. The authentication device can form part of or comprise an adaptor which may be electrically connected between a power outlet and the service station. Alternatively, the authentication device may be embedded into the power outlet such that the service station can be plugged directly into a wall outlet, for example, or could be incorporated/embedded in the service station.

Once the service session is established, the user then requests for service from the service station or from the first user device. The one or more electronic processing devices of the authentication device then provide to the first device, in accordance with the service request, data comprising a service token via an established communication channel between the authentication device and the first user device. The service token is indicative of a selected service option associated with a cost of service at the service station. In some instances, the service token can comprise two portions, namely, a first portion including request information from a current service session, and a second portion including result information from a preceding service session.

In some instances, the request information from the current service session can include, for example, an authentication device identifier, a payment amount due, a maximum authorised payment amount, service duration, service identifier, user device identifier, date/time stamp, session identifier, and so forth. It should be appreciated that the maximum authorised payment amount can be pre-defined by a manufacturer/owner/operator of the service station. Moreover, the result information from the preceding session can include preceding session payment information (for example, fully paid, partially paid, unpaid), outstanding payment amount, preceding session identifier, and so forth.

Service options associated with a particular service station will typically have been pre-selected by a merchant who may be the manufacturer or operator/owner of the service station. The service options will typically be of different payment amounts specific for the service station and the functionality that it provides. For example, a car charging station may provide multiple service options for particular charge cycles or durations whilst a phone charger may simply provide a single service option to fully charge a mobile phone. In a further example, the service options are associated with "subscription" on-demand provision of any amount of power over a pre-determined period, such as, a week, a month, a calendar quarter, a year, and so forth.

Typically, the one or more electronic processing devices of the authentication device communicate with the first user device to provide the service token via a wireless communications protocol such as Bluetooth, Zigbee, Wi-fi and the like. In one example, the authentication device includes a wireless transceiver such as a Bluetooth™ Low Energy (BLE) module. In one example, the electronic processing device is configured to provide a wireless hotspot to which a user device may be connected or paired. When the user comes within a certain vicinity of the authentication device they will be able to connect or pair with the authentication device in order to establish communication therewith. In another example, when the authentication device and the first user device both include a display screen and a camera, communication can also be established between the authentication device and the first user device. The display screen of the authentication device can display matrix barcodes (such as QR codes) which can be captured and subsequently decoded by the first user device and vice versa.

Having received the service token, the first user device is typically responsive to provide the service token and payment/subscription information to a payment system via a communications network. In some instances, the payment information can include a payment card number or a tokenized version of a payment card number, expiry date, card holder name, card token issued by payment system, card token which can be processed by the payment system and so forth. Similarly, the subscription information can include a subscription token or identifier which is issued or can be processed by the payment system, subscriber's credentials (username and password) and so forth.

The payment system is able to validate the service token. If the validation fails, the payment system will reject the service token. Otherwise, the payment system interprets the information from the service token for the current session's request information and the preceding session's result information. The payment system processes the current session's request information and last completed session's result information in parallel.

At step 110, once the service session is established, a service at the service station is consumed by the first user device. However, payment is not able to be carried out for consuming the service as, for example, the first user device may not have data connectivity, the first user device may be powered off prior to payment being made, and so forth. Information on the cost of service consumed by the first user device can be stored on the authentication device. In some instances, the authentication device records the result information of the current service session as the preceding session's result information locally. The authentication device then attempts to send the result information to the first user device for the first user device to forward this result information to the payment system.

At step 120, a service session is established between a second user device and the service station. The service session is established when the second user device is authorised to request for a service at the service station. It should be appreciated that the second user device can interface with the service station via an authentication device which may or may not be integrated with the service station.

Once the service session is established, a second user then requests for service from the service station or from the second user device. The one or more electronic processing devices of the authentication device provide to the second user device, in accordance with the service request, data comprising a service token via an established communication channel between the authentication device and the second user device. The service token is indicative of a selected service option associated with a cost of service during a preceding service session at the service station between the first user device and the service station. In some instances, the service token can comprise two portions, a first portion including request information from a current service session, and a second portion including result information from a preceding service session.

At step 125, the payment system determines whether payment has been captured correctly with the first user device for the preceding service session based on indications of the service token. If payment has been captured correctly for the first user device for the preceding service session, no further action is carried out at step 128.

Having received the service token, the second user device is typically responsive to provide the service token and payment/subscription information to the payment system via a communications network. In some instances, the payment information can include payment card number or a tokenized version thereof, expiry date, card holder name, card token issued by payment system, card token which can be consumed by payment system and so forth. Similarly, the subscription information can include subscription token or identifier which is issued or can be processed by the payment system, subscriber's credentials (username and password) and so forth.

At step 130, the payment system is able to validate the service token. If the validation fails, the payment system will reject the service token. Otherwise, the payment system interprets the information from the service token for the current session's result information and the last completed session's request information. The payment system processes the current session's request information and last completed session's result information in parallel.

It should be noted that the method enables payment for service at the service station even when data connectivity is lost at a user device. This is beneficial in areas where data connectivity is unreliable or during times when there is failure of the data networks. This robustness for payment can lead to reduced instances of non-payment during use of the service stations leading to increased profitability for machine owners/operators.

Furthermore, the method also facilitates on-the-go service stations where turnover of users is high. Even if a user does not pay during the on-the-go service session for some reason(s), payment of the amount which is due for that user's service session can still be processed when a subsequent user establishes a service session with the service station, without the user who consumed the service being present. This payment reliability can lead to reduced instances of non-payment during use of the service stations leading to increased profitability for machine owners/operators.

A number of further features will now be described.

In one example, the one or more service options are also associated with providing power to the service station for a pre-determined amount of time. In this example the user pays for use of the service station for a pre-determined duration of time, typically defined in minutes or hours of usage (e.g. $1.00 to charge a vehicle for 5 minutes, $2.00 to charge a vehicle for 10 minutes). In another example, the service options are associated with payment amounts (e.g. $1.50 for charging battery type A, $3.00 for charging battery type B). In yet a further example, the service options are associated with providing an amount of power to the service station in accordance with an electrical parameter of the service station. For example, an electrical parameter could be the state of charge of a battery and the user pays to fully charge the battery which may be associated with a mobile phone or computer for example. The state of charge may be monitored directly or inferred based on a different parameter such as the current drawn by the service station for example. In a further example, the service options are associated with "subscription" on-demand provision of any amount of power over a pre-determined period, such as, a week, a month, a calendar quarter, a year, and so forth.

Typically, before the authentication device is deployed for use, it is set up by a merchant/owner/operator in order to provide the pre-selected service options. The service options can be stored at the authentication device only, a remote server only, or both the remote server and a merchant device. In this regard, the one or more electronic processing devices typically communicate with the merchant device via a wireless communications protocol in order to pre-configure the authentication device prior to use by the user. The authentication device may communicate with the merchant device via any of the wireless communications protocols previously discussed that may be used to communicate with the user device. It is also possible for the authentication device to be configured for wired communications using protocols such as, for example, Ethernet, serial, I2C, UART, SPI and so forth. The authentication device can be coupled to a merchant-dependent secondary device which enables the wired communications, such as, for example, an SD card with a secure element, a personalized smart card, and so forth.

In one example, a user application is provided on the user device for use in controlling the authentication device to control the service station. The user selects a service option via the application or the user can select a service option at the service station. The selected service option will subsequently be communicated to the authentication device which then generates the service token. As described earlier, the service token can comprise two portions, a first portion including request information from a current service session, and a second portion including result information from a preceding service session. The user device typically includes one or more electronic processing devices to receive a service token from the authentication device, the service token being indicative of a selected service option associated with a cost of service at the service station. The user device then provides the service token to a payment system via a communications network and receives from the payment system an indication of the service options associated with the service token. The payment system is able to interpret the service token to determine the payment options that are associated with the service token for the specific service station. This information will have previously been provided to the payment system from a merchant/owner/operator when configuring the service station before use. The payment system is also able to validate the service token by determining if it is appropriate for the specific service station, determining that the authentication device is an appropriate source for the service token and obtaining the information from the two portions.

The payment information is then provided to the payment system in accordance with the service option selected by the user and the user device receives an approval token from the payment system in response to successful payment using the provided payment information, or a proof of subscription within valid period or usage from payment system. Finally, the user device provides the approval token to the authentication device for authentication using a unique key, the authentication device being responsive to the approval token to control the service station in accordance with the selected service option.

An example of a system for making payment for a service at a service station will now be described with reference to FIG. 2.

In this example, the system 200 includes an authentication device 214 in communication with any of the service stations, for example, a power adaptor 224, and a battery charging station 226. The authentication device 214 is further in communication with one or more user devices 220 optionally each running a payment application. The system 200 also includes one or more merchant devices 230 optionally each running a merchant application. The user and merchant devices 220, 230 are in communication with a payment system 240 via a communications network 250. The payment system 240 may comprise or be in communication with one or more databases 241.

The communications network 250 can be of any appropriate form, such as the Internet and/or a number of local area networks (LANs). It will be appreciated that the configuration shown in FIG. 2 is for the purpose of example only, and in practice the user devices 220, merchant devices 230, authentication device 214 and payment system 240 can communicate via any appropriate mechanism, such as via wired or wireless connections, including, but not limited to mobile networks, private networks, such as an 802.11 network, the Internet, LANs, WANs, or the like, as well as via direct or point-to-point connections, such as Bluetooth, or the like. Typically, the one or more user and merchant devices 220, 230 communicate with the authentication device 214 via a wireless communication protocol such as Bluetooth, Wi-Fi Zigbee, or through Near Field Communication (NFC) but not limited to such. The user and merchant devices 220, 230 may typically communicate with the payment system over a mobile network or via the Internet.

User Device 220 and Merchant Device 230

Figure 3:
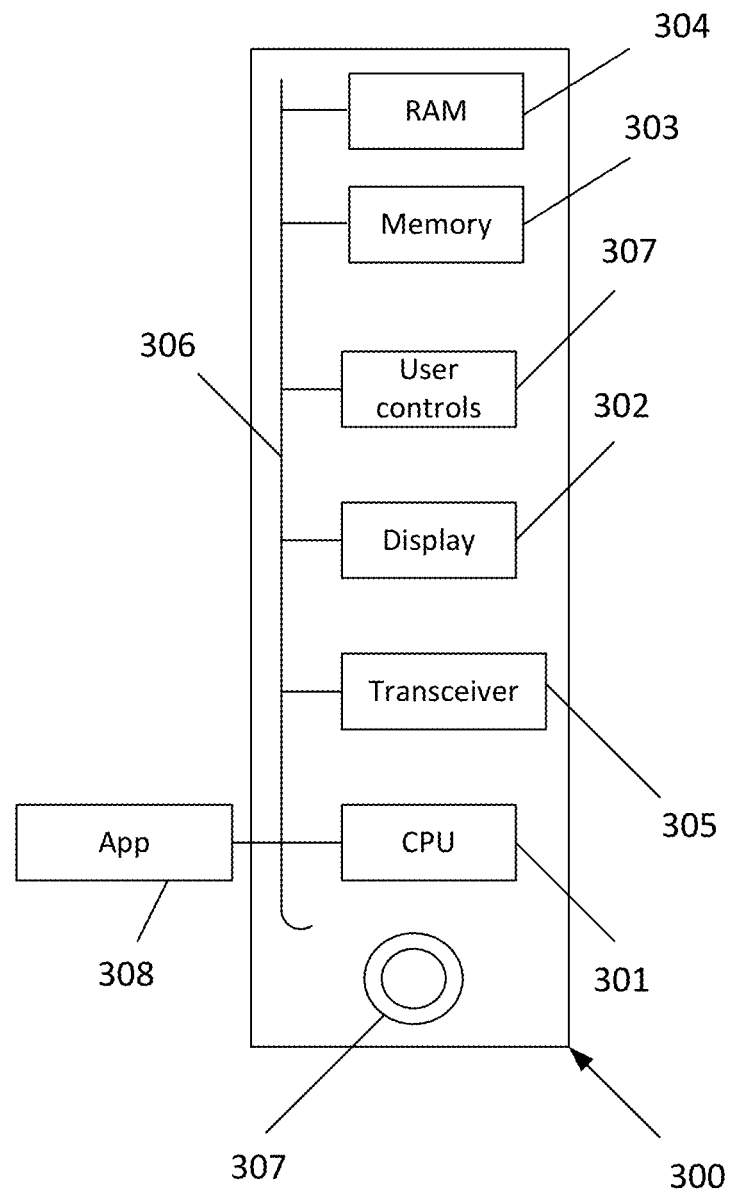
FIG. 3 is a schematic diagram showing components of an example user device of the system shown in FIG. 2.

The user device 220 and merchant device 230 of any of the examples herein may be a handheld computer device such as a smart phone or a PDA such as one manufactured by Apple™, LG™, HTC™, Blackberry™, or Motorola™. The user device 220 or merchant device 230 may include a mobile computer such as a tablet computer. An exemplary embodiment of a user device 300 is shown in FIG. 3. As shown, the device 300 includes the following components in electronic communication via a bus 306:

1. a display 302;
2. non-volatile memory 303;
3. random access memory ("RAM") 304;
4. N processing components 301;
5. a transceiver component 305 that includes N transceivers; and
6. user controls 307.

Although the components depicted in FIG. 3 represent physical components, FIG. 3 is not intended to be a hardware diagram; thus many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 302 generally operates to provide a presentation of content to a user, and may be realized by any of a variety of displays (e.g., CRT, LCD, HDMI, micro-projector and OLED displays). And in general, the non-volatile memory 303 functions to store (e.g., persistently store) data and executable code including code that is associated with the functional components of a browser component and applications, and in one example, a payment application 308 executing on the user device 220 and a merchant application executing on the merchant device 230. In some embodiments, for example, the non-volatile memory 303 includes bootloader code, modem software, operating system code, file system code, and code to facilitate the implementation of one or more portions of the payment application 308 as well as other components well known to those of ordinary skill in the art that are not depicted for simplicity.

In many implementations, the non-volatile memory 303 is realized by flash memory (e.g., NAND or ONENAND memory), but it is certainly contemplated that other memory types may be utilized as well. Although it may be possible to execute the code from the non-volatile memory 303, the executable code in the non-volatile memory 303 is typically loaded into RAM 304 and executed by one or more of the N processing components 301.

The N processing components 301 in connection with RAM 304 generally operate to execute the instructions stored in non-volatile memory 303 to effectuate the functional components. As one of ordinarily skill in the art will appreciate, the N processing components 301 may include a video processor, modem processor, DSP, graphics processing unit (GPU), and other processing components.

The transceiver component 305 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Authentication Device 214

Figure 2:
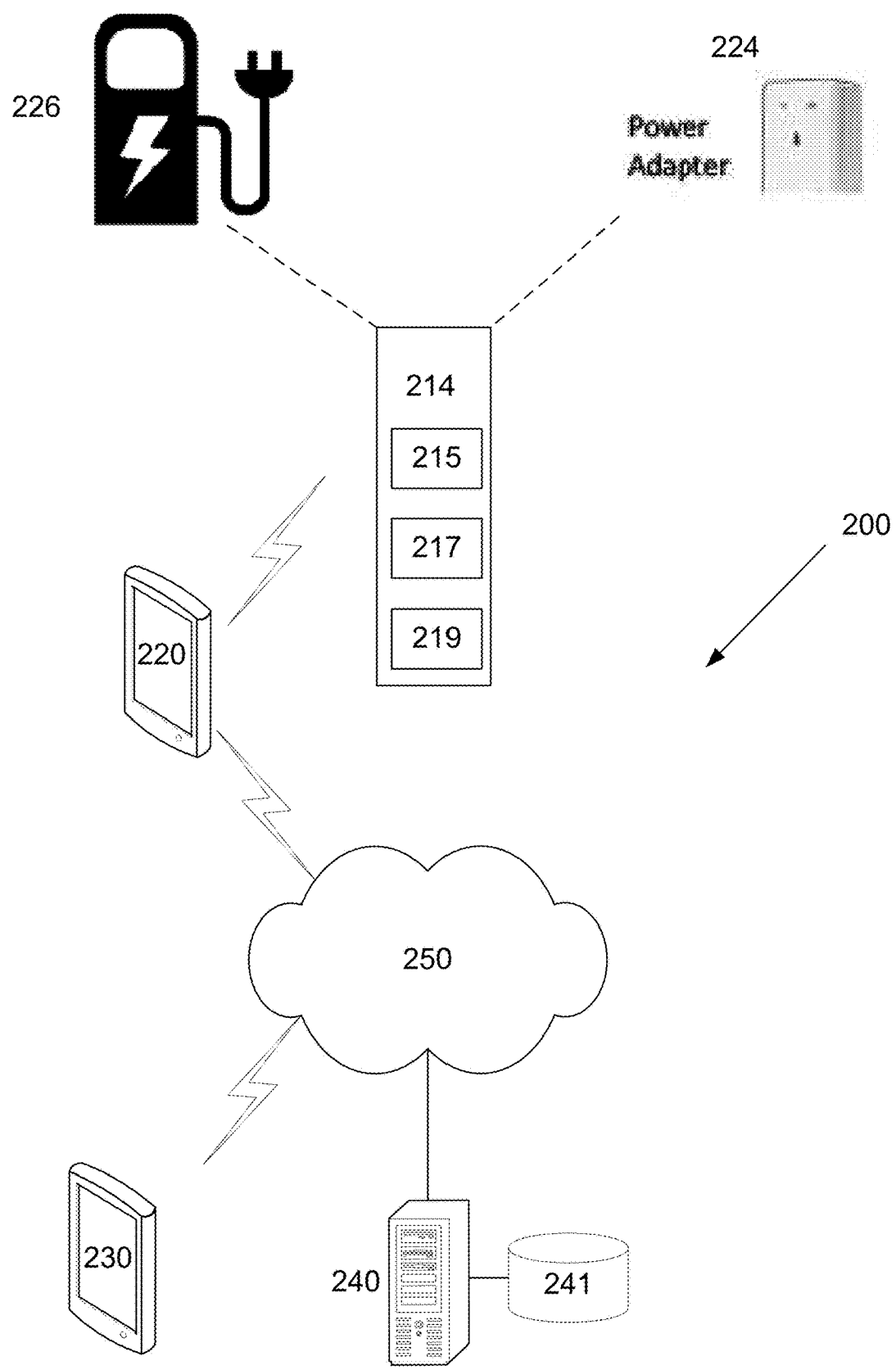
FIG. 2 is a schematic diagram of an example of a system for making payment for a service at a service station.

A suitable authentication device 214 for use in the system 200 is shown in FIG. 2.

In this example, the authentication device 214 includes at least one microprocessor 215, a memory 217 and an external interface 219 interconnected via a bus. In this example the external interface 219 can be utilised by the authentication device 214 when communicating with peripheral devices, such as the user and merchant devices 220, 230. Although only a single interface 216 is shown, this is for the purpose of example only, and in practice multiple interfaces using various methods (e.g. Ethernet, serial, USB, wireless, Bluetooth™ Low Energy (BLE), Near Field Communication (NFC), or the like) may be provided.

In use, the microprocessor 215 executes instructions in the form of applications software stored in the memory 217 to allow communication with the user device 220, for example to provide a service token and receive an approval token therefrom, and the merchant device 230, for example to provide the initialization data packet and receive the provisioning data. The applications software may include one or more software modules, and may be executed in a suitable execution environment, such as an operating system environment, or the like.

Accordingly, it will be appreciated that the authentication device 214 may include a suitable processing system or component, such as a microprocessor, microchip processor, logic gate configuration, firmware optionally associated with implementing logic such as an FPGA (Field Programmable Gate Array), or any other suitably configured electronic device, system or arrangement. Thus, in one example, the authentication device 214 is a processing system such as an Intel Architecture based processing system, which executes software applications stored on non-volatile (e.g., hard disk) storage.

Payment System 240

Figure 4:
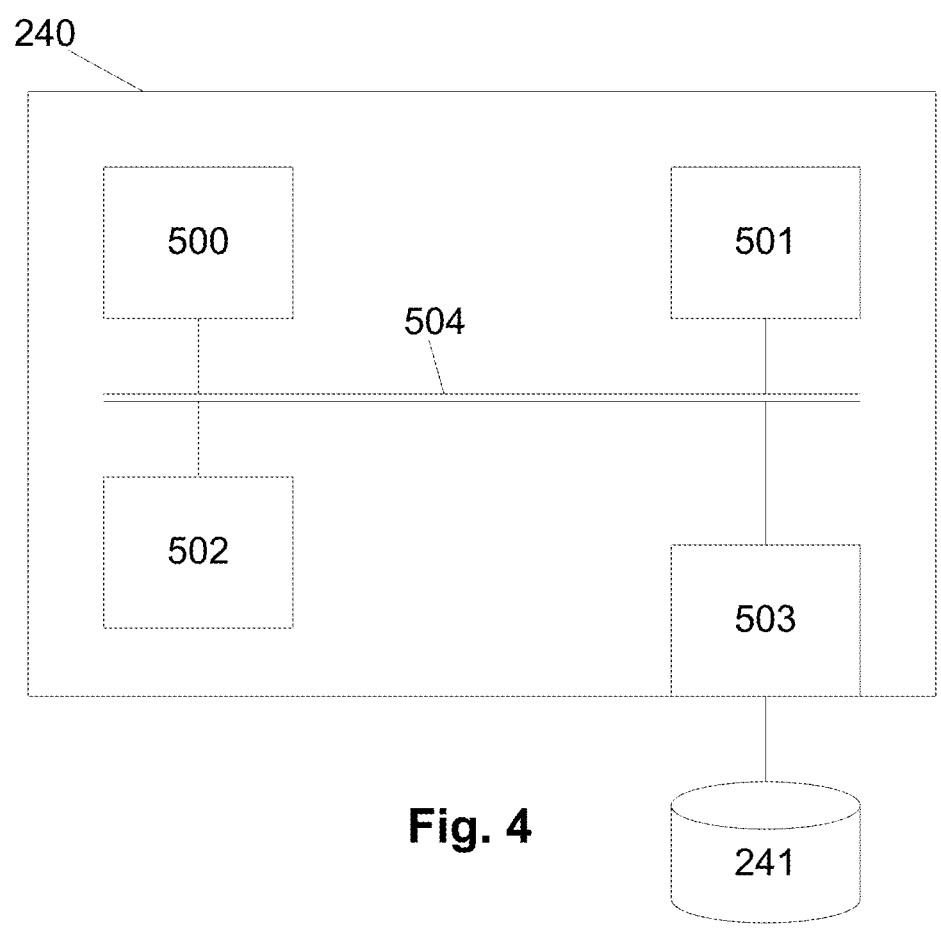
FIG. 4 is a schematic diagram showing components of an example payment system of the system shown in FIG. 2.

A suitable payment system 240 for use in the system described in of the above examples is shown in FIG. 4.

In this example, the payment system 240 includes a server that includes at least one microprocessor 500, a memory 501, an optional input/output device 502, such as a display, keyboard, touchscreen and the like, and an external interface 503, interconnected via a bus 504 as shown. In this example the external interface 503 can be utilised for connecting the payment server 240 to peripheral devices, such as user and merchant devices 220, 230, the communication networks 250, databases 241, other storage devices, or the like. Although a single external interface 503 is shown, this is for the purpose of example only, and in practice multiple interfaces using various methods (e.g. Ethernet, serial, USB, wireless or the like) may be provided.

In use, the microprocessor 500 executes instructions in the form of applications software stored in the memory 501 to allow communication with the user device 220, for example to receive a service token and to provide service options, and the merchant device 230, for example to receive the registered initialization token and to provide provisioning data. The applications software may include one or more software modules, and may be executed in a suitable execution environment, such as an operating system environment, or the like.

Accordingly, it will be appreciated that the payment system 240 may be formed from any suitable processing system, such as any electronic processing device, including a microprocessor, microchip processor, logic gate configuration, firmware optionally associated with implementing logic such as an FPGA (Field Programmable Gate Array), or any other electronic device, system or arrangement. However, the payment system 240 may also be formed from a suitably programmed PC, Internet terminal, lap-top, or hand-held PC, a tablet, or smart phone, or the like. Thus, in one example, the payment system 240 is a processing system such as an Intel Architecture based processing system, which executes software applications stored on non-volatile (e.g., hard disk) storage.

In other examples, such as described above, the payment system includes multiple computer systems interacting, for example, via a distributed network arrangement. As distributed networking is known in the art, it will not be described further in more detail.

In particular, the payment system may include or be in communication with a number of processing systems associated with each of a merchant, an issuer, acquirer, card network and payment gateway, or alternatively, the payment system may be any one or more of these entities.

In one example as will be well understood in the art, a card acceptance device such as a contactless POS terminal or payment gateway server sends the user account information and payment information to the merchant's acquirer. The acquirer then requests that the card network get an authorization from the user's issuing bank. The card network submits the transaction to the issuer for authorization and the issuing bank then authorizes the transaction if the account has sufficient funds to cover the amount payable. The issuer then routes payment to the acquirer who then deposits the payment into the merchant's account.

Figure 5A:
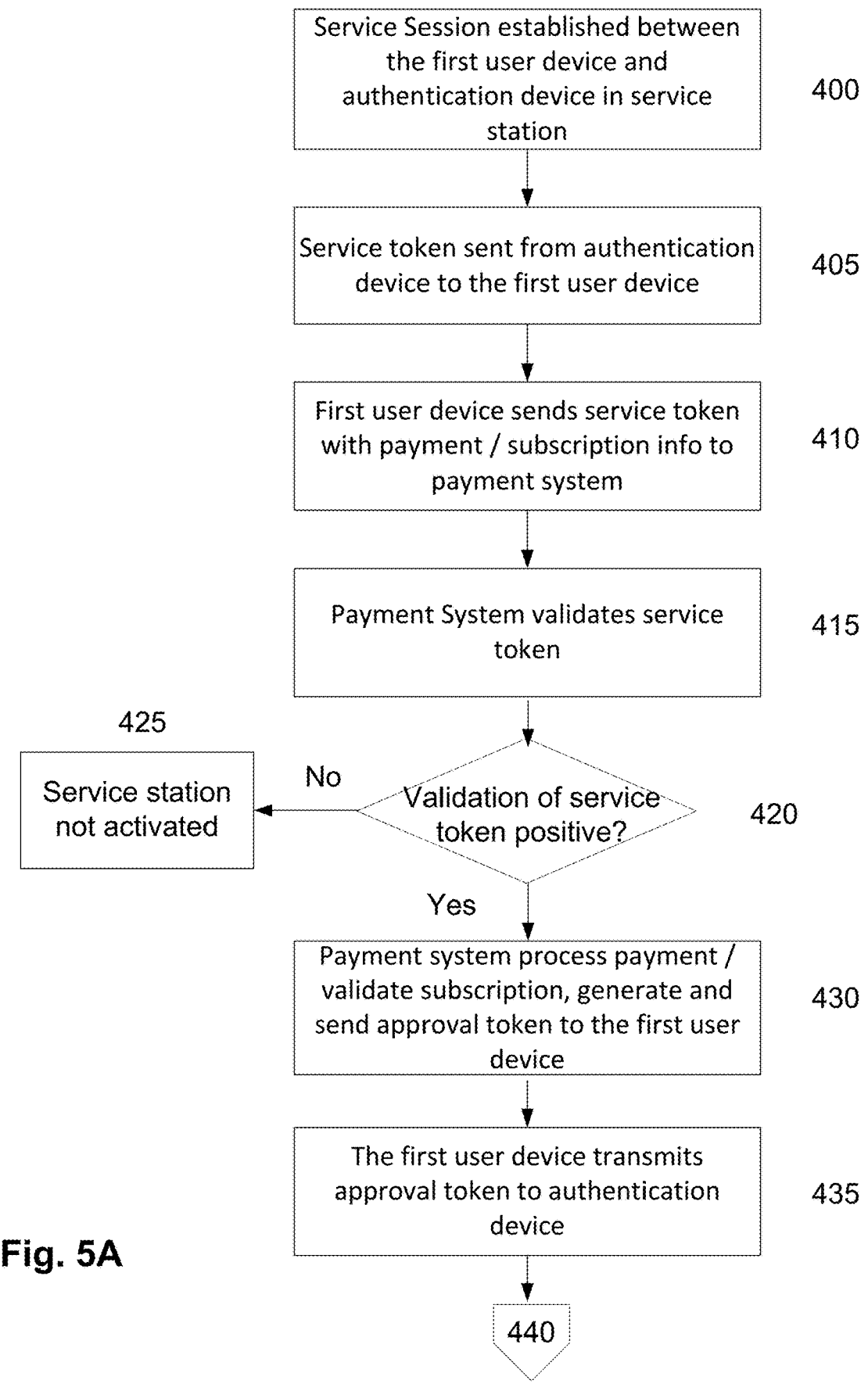
FIGS. 5A, 5B and 5C collectively show a flowchart of a specific example of a method for making payment for a service at a service station.
Figure 5B:
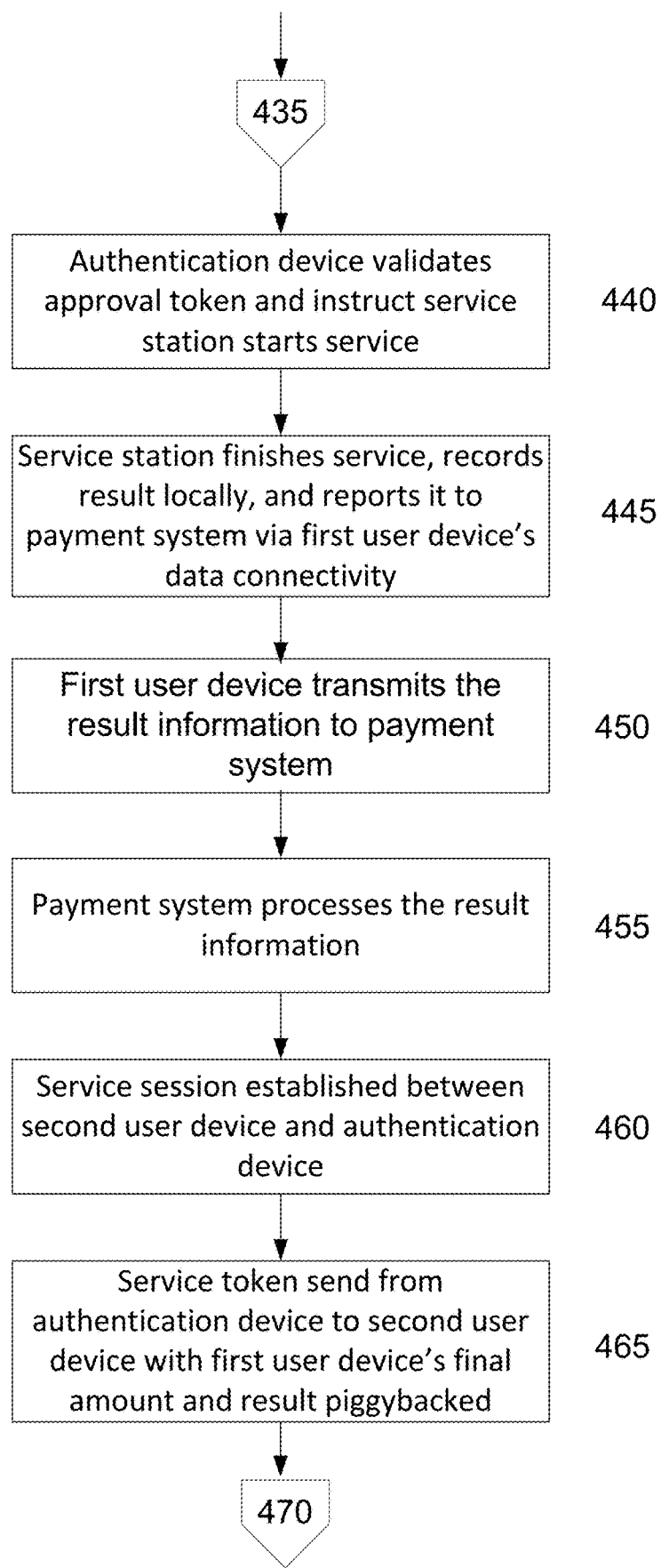
Figure 5C:
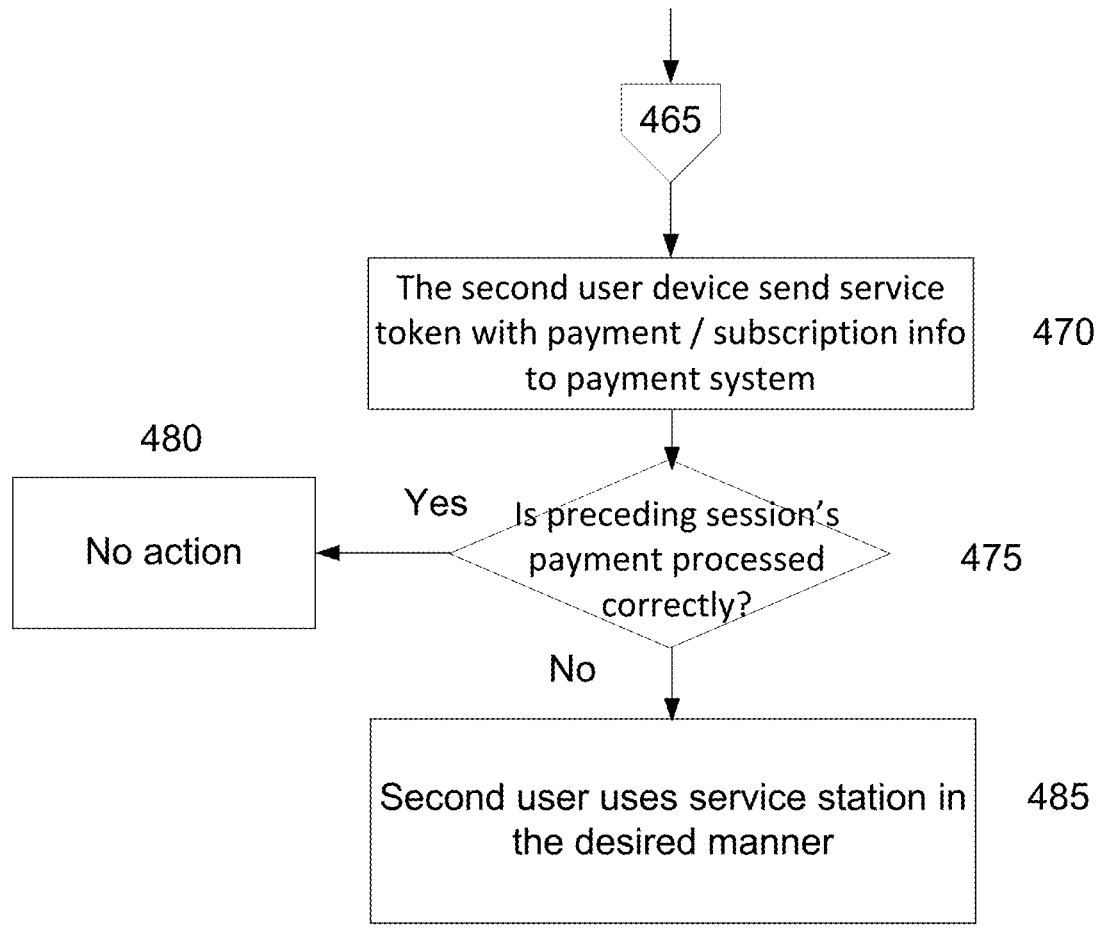

To illustrate further features of preferred practical implementations of the method, a further detailed example of a method for making payment for a service at a service station will now be described with reference to FIGS. 5A-5C.

It should be appreciated that in the following method, the authentication device is part of the service station. Thus, during instances of the method when the service station transmits or receives tokens, it should be taken to mean the authentication device transmits or receives tokens.

In this example, at step 400, a service session is established between a first user device and a service station. The service session is established when the first user device is authorised to request for a service at the service station. It should be appreciated that the first user device can interface with the service station via an authentication device. The authentication device can form part of or comprise an adaptor which may be electrically connected between a power outlet and the service station. Alternatively, the authentication device may be embedded into the power outlet such that the service station can be plugged directly into a wall outlet for example, or could be incorporated into the service station. In another example, the authentication device may also be integrated as part of the service station.

Typically, the one or more electronic processing devices of the authentication device communicate with the first user device via a wireless communications protocol such as Bluetooth, Zigbee, Wi-fi and the like. In one example, the authentication device includes a wireless transceiver such as a Bluetooth™ Low Energy (BLE) module. In another example, the electronic processing device can be configured to provide a wireless hotspot to which a user device may be connected or paired. When the user comes within a certain vicinity of the authentication device they will be able to connect or pair with the authentication device in order to establish communication therewith.

In another example, if the authentication device and user device both include a display screen and camera, communication between the devices can also be established. The authentication device can display matrix barcodes (such as QR codes) which can be captured and subsequently decoded by the user device and vice versa.

Once the service session is established, the user can request for service from either the service station or the user's device. The service options can be pre-configured by a merchant who may be the manufacturer or operator/owner of the service station. For example, a car charging station may provide multiple service options for charging cycle or duration whilst a phone charger may simply provide a single payment option to fully charge a mobile phone. At step 405, the service request will be sent to the authentication device via the established communication channel between user device and authentication device, or the interface between authentication device and service station. The authentication device will generate a service token based on the service request and transmit to the first user device. The service token can comprise two parts, namely, a first portion including request information for a current session, and a second portion including result information for a preceding service session.

In some instances, the request information from the current service session can include, for example, an authentication device identifier, a service station identifier, a payment amount due, a maximum authorised payment amount, service duration, service identifier, user device identifier, date/time stamp, session identifier, and so forth. It should be appreciated that the maximum authorised payment amount can be pre-defined by a manufacturer/owner/operator of the service station. Moreover, the result information from the preceding session can include preceding session payment information (for example, fully paid, partially paid, unpaid), outstanding payment amount, preceding session identifier, and so forth.

At step 410, having received the service token, the first user device is typically responsive to provide payment information or subscription information along with the service token to a payment system via a communications network. The payment information can include, for example, credit card number, expiry date, card holder name, card token issued by payment system, or card token which can be processed by payment system, and so forth. Similarly, the subscription information can include subscription token or identifier which is issued or can be processed by the payment system, subscriber's credentials (username and password) and so forth.

At step 415, the payment system validates the service token. At step 420, if the validation fails, payment system will reject the service token and the service station remains inactive at step 425. If the validation is positive, the payment system then processes the service token in relation to request information for the current session and result information for the preceding session at step 430. The payment system can process the request information and result information in parallel. If payment information is provided from the first user device, the payment system will authorize a payment amount defined by the service token. After authorization is successful, the payment system will generate an approval token for transmission to the first user device. The approval token can instruct the authentication device to instruct service station to commence a service or deliver the product as requested by the user. The approval token may also contain information such as maximum duration/usage/number/quantity of service. If subscription information is provided, the payment system will load the subscription details from its storage and validate whether the subscription is valid for the requested service at the service station. If the subscription is valid, the payment system will also generate the approval token and send to the first user device. The payment system can also maintain a record of the service token and associated payment activity or subscription activity in its associated storage, like database, or file.

At step 435, the first user device transmits the approval token to the authentication device via the same channel used as in step 405. At step 440, the service station validates the approval token and upon positive validation, consequently instructs the service station to commerce the service or deliver the product which is requested by user.

At step 445, once the service is completed or product is delivered, the service station transmits a notification to the authentication device. The authentication device records the result information of the current session as the preceding session's result information locally. The result information includes, for instance, service status (success or failure), service duration, final amount, number of products delivered, number of rounds of service, current session identifier, and so forth. Meanwhile, the authentication device attempts to use the communication channel as used in earlier steps to transmit the result information to the first user device. At step 450, the first user device transmits this result information to payment system.

At step 455, the payment system validates the authenticity of the result information generated from the authentication device. Upon successful validation, the payment system will process the result information and obtain a correct payable amount. For example, if the service is successful, and the correct payable amount is the same as the authorized amount in step 430, the payment system determines the full capture amount to be the authorized amount. If the service is successful, and the correct payable amount is less than the authorized amount in step 430, the payment system will only deduct the correct payable amount specified in the result, and disregard the rest of the authorized amount. For illustrative purposes, if the payment system authorized $3 in step 430, and authentication device reported $2 as the correct payable amount, the payment system deducts $2 from the desired payment instrument of the user and credits $1 back to user. If the service station did not operate in a desired manner in accordance to the service option, the authorized amount will be returned to the user by payment system.

The correct payable amount should not exceed the authorized amount. If the chargeable amount at the service station reaches the authorized amount, the authentication device consequently instructs the service station to end the current session, and sends a notification message to the user device to start a new session for a new sequence of payment authorization. This may happen in the background and work seamlessly without service interruption, or it may pause the current service and prompt to user for confirmation prior to the start of new session.

If the first user device provided subscription information at step 410, the payment system will update subscription information. For example, if the user selected a one month plan for usage of a predefined type of service station, a last instance usage for the subscription will be updated. In another example, if the user subscribed for a predefined number of usage instances of the same type of service station, the payment system will update the subscription information with a number of remaining usage instances. In a further example, if the user subscribed for a hundred minutes of washing machine time, and the result information indicates that the user consumed thirty minutes of washing machine time, the payment system will update the subscription information with seventy minutes of washing machine time remaining.

In some circumstances, data connectivity may not be perpetually available and the communication channel between authentication device and user device cease to be present. In this regard, the result information may not be delivered to the payment system via the first user device. In these circumstances, when a second user attempts to consume service at the same service station, the authentication device will attempt to use the data connectivity of second user device to send the first user device session's result information to payment system.

At step 460, a second user device establishes a service session with the same service station, as per step 400 for the first user device. A new service token will be generated for the second user device. The new service token contains the result information for the preceding service session with the first user device, and the service request information for the second user device.

At step 465, the service token with second user device's service session request information and the first device session's result information is transmitted from authentication device to the second user device, similar to step 405. Subsequently, in step 470, the first user device's service session result will be sent to payment system as part of the service token for the second user device, when the second user requests for service at the service station. It should be appreciated that the first user device and the second user device can be the same device in an instance when the authorised limit for the preceding session is met.

The payment system receives the current session's service request information and the preceding session's result information at the same time. The result information of the preceding session is processed as follows.

At step 475, if the preceding session's result information is processed correctly, no action regarding payment is needed at step 480. For illustrative purposes, if payment has been made for the preceding session, there is no need to make payment for the preceding session.

In another example, if the correct payable amount for the preceding session is the same as the authorized payment amount in step 430, but the result is not delivered to the payment system due to user device's connection failure in step 450, the payment system can be pre-configured with a time duration to automatically deduct the authorized amount. Once the time duration is reached, the authorized amount is automatically deducted even without result information. In such case, the preceding session's result shows that the final amount is the same as the captured amount. It means the preceding session is processed correctly.

If the last completed session's result is not processed correctly, the payment system will process the result and capture the correct payable amount, provide a refund if overcharged, or update the subscription information, as per step 455. For illustrative purposes, if the result is not transmitted in step 450, and the authorized amount is not obtained, once the payment system receives the preceding session result as part of preceding session information, the correct payable amount as indicated in the result information is obtainable.

In another example, if the authorized amount is automatically determined due to passage of a pre-determined time period, and the correct payable amount from result information is less than the authorized amount, the payment system will refund the overcharged amount. Similarly, the subscription information will be updated to the correct information based on the last completed session's result information.

As mentioned earlier, loss of data connectivity may occur, and the following scenario may occur. After the payment system processed the service token with the current session request information and the preceding session's result information, the payment amount for the current session is authorized as described in step 430. But the approval token for the current session is not successfully transmitted to authentication device in step 435. Under such circumstances, the preceding session's result information in authentication device is not changed, and no service is provided in the current session due to the connectivity failure. When a subsequent session is established, the service token for the subsequent session contains the subsequent session's request information and the current session's result information. When the payment system receives the subsequent session's service token, it determines the last authorized session by the same authentication device. If the last authorized session in payment system is the same as the last completed session provided by service token, the payment system will process the last completed session's result information as in step 455. If the last authorized session does not match the last completed session, as in this case, the last authorized session in payment system is the preceding session, but the last completed session result is the current session. The payment system then determines that the preceding session's approval token is not delivered to the authentication device. It will then correct the payment or subscription information associated with the preceding session. If the preceding session's payment amount is still under authorization, the payment system will release the authorization amount. If the preceding session's correct payable amount is captured, the payment system will try to process the payment appropriately. With regard to updating of subscription information, the payment system will also make requisite updates to the subscription account.

Subsequently, at step 485, the second user then proceeds to use the service station in an intended manner as per the desired service option or subscription service.

Accordingly, it will be appreciated that in at least one example the above described methods and system may enable payment for service at the service station even when data connectivity is lost between at a user device. This is beneficial in areas where data connectivity is unreliable or during instances when there is failure of the data networks. This robustness for payment can lead to reduced instances of non-payment during use of the service stations leading to increased profitability for machine owners/operators. Furthermore, the method and system also facilitates on-the-go service stations where turnaround of users is high. Even when the users do not pay during the on-the-go service session for whatever reason(s), the amount which is due for the service session can still be obtained when a subsequent user establishes a service session with the service station, without a presence of the user who consumed the service. This payment reliability can lead to reduced instances of non-payment during use of the service stations leading to increased profitability for machine owners/operators.

Whilst there have been described in the foregoing description preferred embodiments of the present invention, it will be understood by those skilled in the technology concerned that many variations or modifications in details of design or construction may be made without departing from the present invention.

The invention claimed is:

1. A system for making payment for a first service session at a service station initiated by a first user device, the system including one or more electronic processing devices configured to:
   provide a service token to a second user device upon establishment of a second service session between the second user device and the service station, the service token comprising a first portion including request information for the second service session, and result information for the first service session;

provide, from the second user device, the service token and payment or subscription information to a payment system via a communications network;

process, at the payment system, the service token and the payment or subscription information to determine an authorised payment amount;

determine, at the payment system, if payment for the first session has been completed; and process, at the payment system, in response to determining that payment for the first service session has not been completed, a payment transaction for the first service session, or an update to the subscription information.

2. The system according to claim 1, wherein the request information comprises data selected from the group consisting of: a service station identifier, a payment amount due, a maximum authorised payment amount, service duration, service identifier, user device identifier, date/time stamp, and session identifier; and wherein the result information comprises data selected from the group consisting of: first session payment information, outstanding payment amount, and first session identifier.

3. The system according to claim 1, wherein the authorised payment amount is capped at a pre-determined amount.

4. The system according to claim 1, wherein the one or more electronic processing devices are in communication with the first and second user devices via a wireless communications protocol.

5. The system according to claim 4, wherein the wireless communications protocol is Bluetooth™ Low Energy (BLE) protocol.

6. The system according to claim 1, wherein the first service session is immediately preceding the second service session.

7. A computer-implemented method for making payment for a first service session at a service station initiated by a first user device, the method including, in one or more electronic processing devices:

providing a service token to a second device, upon establishment of a second service session between a second user device and the service station, the service token comprising a first portion including request information for the second service session, and result information for the first service session;

providing, from the second user device, the service token and payment or subscription information to a payment system via a communications network;

processing, at the payment system, the service token and the payment or subscription information to determine an authorised payment amount;

determining, at the payment system, if payment for the first service session has been completed; and processing, at the payment system, in response to determining that payment for the first service session has not been completed, a payment transaction for the first service session, or an update to the subscription information.

8. The method according to claim 7, wherein the request information comprises data selected from the group consisting of: a service station identifier, a payment amount due, a maximum authorised payment amount, service duration, service identifier, user device identifier, date/time stamp, and session identifier; and wherein the result information comprises data selected from the group consisting of: first session payment information, outstanding payment amount, and first session identifier.

9. The method according to claim 7, wherein the authorised payment amount is capped at a pre-determined amount.

10. The method according to claim 7, wherein the one or more electronic processing devices are in communication with the first and second user devices via a wireless communications protocol.

11. The method according to claim 10, wherein the wireless communications protocol is Bluetooth™ Low Energy (BLE) protocol.

12. The method according to claim 7, wherein the first service session is immediately preceding the second service session.

13. A non-transitory computer readable storage medium embodying thereon a program of computer readable instructions which, when executed by one or more processors of a payment system in communication with a plurality of user devices, cause the payment system to perform a method for making payment for a first service session initiated by a first user device at a service station, the method embodying the steps of:

receiving a service token from a second user device, upon establishment of a second service session between a second user device and the service station, the service token comprising a first portion including request information for the second service session, and result information for the first service session;

receiving, from the second user device, payment or subscription information to a payment system via a communications network;

processing the service token and the payment or subscription information to determine an authorised payment amount;

determining, if payment for the first service session has been completed; and processing, in response to determining that payment for the first service session has not been completed, a payment transaction for the first service session, or an update to the subscription information.

14. The storage medium according to claim 13, wherein the request information comprises data selected from the group consisting of: a service station identifier, a payment amount due, a maximum authorised payment amount, service duration, service identifier, user device identifier, date/time stamp, and session identifier; and wherein the result information comprises data selected from the group consisting of: first session payment information, outstanding payment amount, and first session identifier.

15. The storage medium according to claim 13, wherein the authorised payment amount is capped at a pre-determined amount.

16. The storage medium according to claim 13, wherein the one or more processors are in communication with the first and second user devices via a wireless communications protocol.

17. The storage medium according to claim 16, wherein the wireless communications protocol is Bluetooth™ Low Energy (BLE) protocol.

18. The storage medium according to claim 13, wherein the first service session is immediately preceding the second service session.

* * * * *